March 9, 1971     G. A. SHOWERS     3,568,322
MEASURING INSTRUMENT
Filed Dec. 13, 1968     2 Sheets-Sheet 1
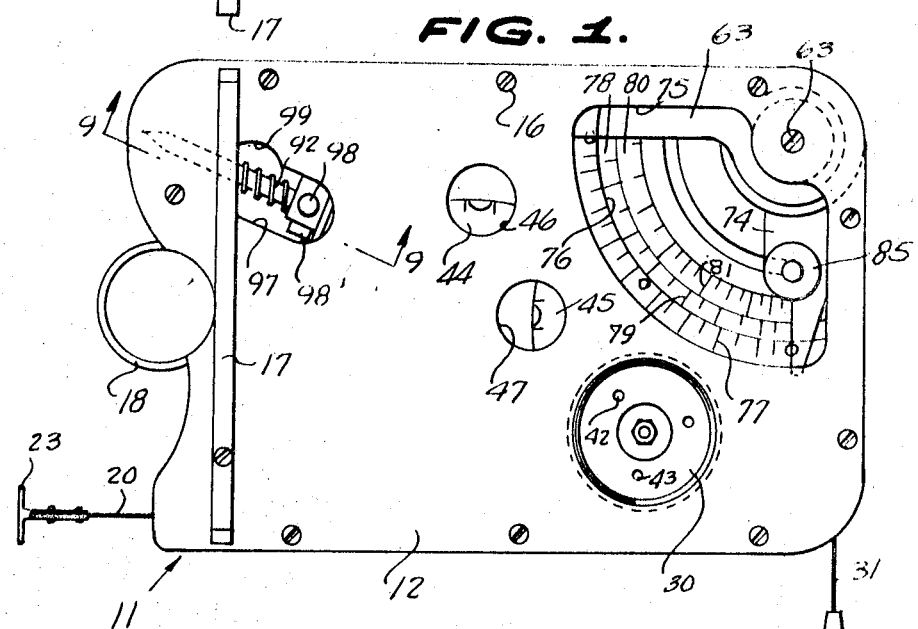
INVENTOR.
GARTH A. SHOWERS,
BY
Berman, Davidson & Berman
ATTORNEYS.

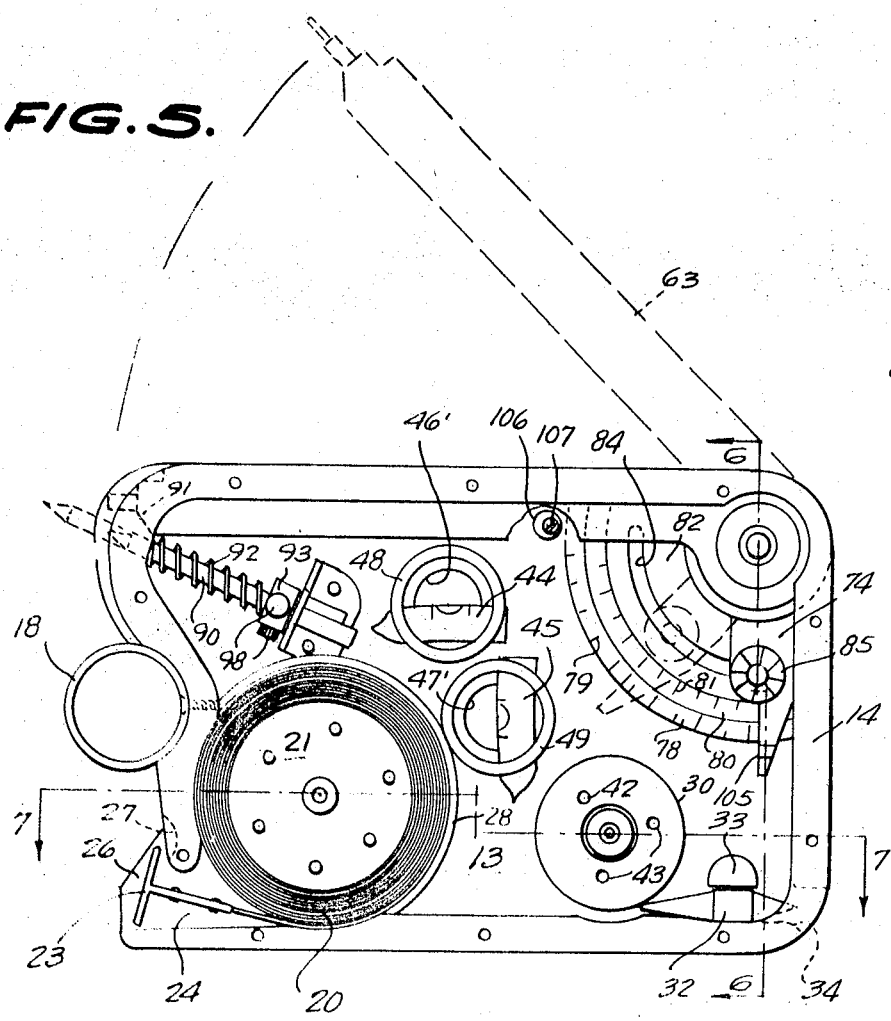

United States Patent Office 3,568,322
Patented Mar. 9, 1971

3,568,322
MEASURING INSTRUMENT
Garth A. Showers, Main St., Tannersville, N.Y. 12485
Filed Dec. 13, 1968, Ser. No. 783,559
Int. Cl. B43l 9/00; G01b 3/10, 3/16
U.S. Cl. 33—27
5 Claims

ABSTRACT OF THE DISCLOSURE

A combination measuring, marking, angle measuring, and arc-scribing instrument, including bubble levels. The instrument has a case containing a flexible measuring tape, a plumb bob cord reel with cord and plumb bob attached, an angle scale, and adjacent distance scales arranged concentrically on an arc with pivoted pointer swingable thereover. The pointer has a clamp for securing it in adjusted position. A scriber arm is attached perpendicularly to the pointer and is swingable outwardly relative to a side edge of the case. The case contains an extensible center pivot point which can be engaged in a surface to be scribed. The center pivot point is biased to a normally retracted position, but can be manually extended and rotated to lock it in extended position.

---

This invention relates to measuring and scribing devices, and more particularly to a combination distance and angle measuring and marking device including an extensible measuring tape, a plumb bob, and bubble levels.

A main object of the invention is to provide a novel and improved lay-out, measuring and marking instrument which is very simple in construction, which is easy to use, and which can be employed for a wide variety of measuring, checking and marking operations on activities involving the use of geometric patterns, such as squares, triangles, rectangles, octagon, stars, and the like, or where angular measurement or marking is required, the device being very versatile and being universal in its application.

A further object of the invention is to provide an improved combination measuring, marking, angle-measuring, arc-scribing and level-checking instrument which is very compact in size, which is inexpensive to manufacture, which is durable in construction, and which provides a high degree of acuracy.

A still further object of the invention is to provide an improved combination measuring, marking, angle-measuring, arc-scribing, and level-indicating device which is easy to read, which can be employed quickly and accurately for marking right angles or for squaring measurements, which has readily-accessible components, and which, when in folded condition, can be easily and safely carried in the user's pocket without risk of tearing, or otherwise damaging the user's clothing.

Further objects and advantages of the invention will become apparent from the following description and claims, and from the accompanying drawings, wherein:

FIG. 1 is a side elevational view of an improved combination measuring and marking instrument constructed in accordance with the present invention.

FIG. 2 is a top view of the instrument of FIG. 1.

FIG. 3 is an end elevational view of instrument of FIGS. 1 and 2.

FIG. 4 is a bottom view of the instrument of FIG. 1.

FIG. 5 is an elevational view of the instrument of FIG. 1 with its front cover plate removed, showing its internal components.

FIG. 6 is a transverse vertical cross-sectional view taken substantially on the line 6—6 of FIG. 5.

FIG. 7 is a horizontal cross-sectional view taken substantially on line 7—7 of FIG. 5.

FIG. 8 is an enlarged fragmentary vertical cross-sectional view taken substantially on the line 8—8 of FIG. 2.

FIG. 9 is an enlarged fragmentary cross-sectional view taken substantially on the line 9—9 of FIG. 1.

FIG. 10 is a fragmentary transverse vertical cross-sectional view taken substantially on line 10—10 of FIG. 9.

Referring to the drawings, 11 generally designates a combination measuring, marking, angle-measuring and arc-scribing instrument constructed in accordance with the present invention. The instrument 11 comprises a housing defined by a pair of parallel front and rear plates 12 and 13 of generally rectangular shape and of similar size which are secured to an interventing separator wall 14 which extends substantially around the margin of the front and rear cover plates 12 and 13. The plates may be secured to the separator wall member 14 in any suitable manner, preferably, by means of screws 16, whereby the plates may be removed, at times, to provide access to the interior of the housing.

A transversely-extending squaring bar 17 is secured to the cover plate 12 adjacent the left end of the housing, as viewed in FIGS. 1, 2 and 4, the bar 17 being engageable against a straight edge so that a longitudinal edge of the housing may be employed for checking the squareness of a corner, or the perpendicularity of a line with reference to the straight edge engaged by bar 17. Also, the use of the bar 17 in this manner enables a square mark to be drawn on a workpiece in the same manner as by use of a T-square.

As shown in FIGS. 1 and 5, the left end of the housing is recessed so that it is generally concave, and secured to the intermediate portion of said recessed left edge is a circular handle ring 18. Mounted in the housing substantially in the lower left corner thereof, as viewed in FIG. 5, is a conventional flexible steel tape 20, wound on a reel 21 which is provided with an internal spiral spring 22 biasing the reel 21 to wind up the steel tape 20 thereon. The end of the steel tape is provided with a generally T-shaped abutment head which can be hooked over the edge of an object to be measured, whereby to hold the end of the tape as it is unwound from the reel 21, and also allowing the taps to be employed, at times, as a straight edge. As in the case of the conventional spring-biased steel measuring tape, when the end member 23 is released, the coiled spiral spring 22 winds up the tape onto the reel 21, drawing the tape through a clearance space 24 provided therefor in the lower left corner of the housing, as viewed in FIG. 5, the aperture thus defined being too small to allow the head of the T-shaped member 23 to be drawn into the housing.

Thus, the lower left corner portions of the plates 12 and 13, as viewed in FIGS. 1 and 5, are provided with corner extensions 26 between which the head portion of member 23 is receivable when the steel tape 20 is retracted, for example, to the position thereof shown in FIG. 5, the outer portion of the separator member 14 being formed with a recess 27 in which the top end of the head of member 23 is receivable in its retracted position. Also, the recess 27 provides clearance for the user to insert his fingernail therein so that it can be engaged behind the head of the element 23 to pull out said member 23 and the tape 20 attached thereto when it is desired to employ the tape.

An arcuate partition wall 28 is rigidly secured in the housing to define a generally circular space in the lower left corner thereof, as viewed in FIG. 5, to receive the tape assembly including the flexible steel tape 20. As shown in FIG. 7, the inner end of spring 22 is anchored to a rigid sleeve 29 rigidly secured in the housing concentrically with the arcuate wall 28.

Journaled in the housing adjacent the lower right corner thereof, as viewed in FIG. 5, is a grooved reel 30 on which is wound a flexible plumb bob cord 31, the cord having secured to its outer end a hardened steel plumb bob 32 which is normally received between a lug 33 rigidly secured to rear plate 13 and the lower longitudinal portion of separator wall 14 in the manner illustrated in FIG. 5, the corner of the separator wall being apertured as shown at 34 so as to allow the plumb bob 32 to be, at times, lowered through the aperture. The front plate member 12 is provided with a circular opening 35 providing access to the front face of reel 30 so as to allow it to be manually rotated for unwinding the cord 31 therefrom, or for rewinding cord 31 thereon. The reel 30 is rotatably mounted on a pivot bolt 36 threadedly engaged through a friction disc 37 cemented to the inside surface of plate 12, the bolt 36 extending through a recess 38 in reel 30, and being provided with a washer 39 and retaining nut 40, a biasing spring 41 being provided on the bolt between the washer 39 and the end wall of recess 38 to bias the reel 30 into frictional engagement with the disc 37. Thus, the flexible cord 31 can only be extended or retracted by manually rotating the reel 30 which may be accomplished by engaging the reel through the aperture 35. As shown in FIG. 7, the reel may be provided with a bore, or recess, 42 adapted to receive a pencil point, or other rod-like object which can be employed as a crank to rotate the reel. The exposed portion of the reel may also be provided with bolt heads 43, likewise accessible through the aperture 35 allowing the reel to be rotated by the user's fingernail, if so desired.

Mounted in the intermediate portion of the housing are, respectively, the horizontal bubble level assembly 44 and the vertical bubble level assembly 45, each being of substantially conventional construction, but being located so that the bubble level tube is visible through suitable apertures provided in the front cover plate 12, said apertures being shown, respectively, at 46 and 47 in FIG. 1. The rear plate 13 may be likewise provided with similar apertures so that the bubble levels can be viewed from either side of the housing. Thus, as shown in FIG. 5, the rear plate 13 may be provided with apertures 46' and 47' registering with the apertures 46 and 47 of plate 12, with the bubble level assemblies secured in rings 48, 49, rigidly connected to the plate 13 concentrically with the apertures 46' and 47'.

Designated at 60 is a pivot sleeve which is secured to the upper corner portion of rear plate 13 by a fastening screw 61, as shown in FIG. 6, and which receives an opposite screw 62 securing the upper right corner portion of front plate 12 thereto, as shown in FIG. 1. A scriber arm 63 is pivoted on the sleeve 60, said scriber arm being receivable in a longitudinal slot 64 provided in the top longitudinal portion of separator member 14, as viewed in FIG. 5. As shown in FIG. 2, the scriber arm 63 extends substantially for the entire length of the top longitudinal edge of the housing. The free end of arm 63 is provided with a longitudinal recess 65 which reversibly receives a scriber point 66, which may be of the ball-point type having the scribing tip 67. As shown in FIG. 8, the scribing point 66 is receivable in the recess 65 at times, with the point 67 housed in an end ball portion 68 provided therefor. The reversible scribing assembly 66 is frictionally held in position by a leaf spring 69 disposed in a recess 70 extending longitudinally of the main recess 65 and retained at its right end, as viewed in FIG. 8, by being received in an undercut 71 provided in the inner end of recess portion 70 and at its outer end by an undercut abutment lug 72 secured in the outer end portion of main recess 65. When the scriber arm 63 is not in use, the scribing assembly 66 is positioned in the manner illustrated in FIG. 8 with its scribing tip 67 received in the end of bore portion 68. However, when the arm 63 is to be used for scribing, the assembly 66 can be pulled out and reversed, being then frictionally engaged by the spring 69 to retain it in scribing position with its marking tip element 67 exposed, for example, as shown in dotted view in FIG. 5. The outer end of the arm 63 is provided with a right-angled end notch 73 which may be employed as a pencil point guide when the arm is used as an adjustable marking gauge.

Rigidly secured to the pivoted portion of arm 63 and extending perpendicularly thereto is a flat pointer arm 74 which extends radially in a sector-shaped viewing window 75 provided in plate 12 concentrically with pivot sleeve 60, the free end the pointer arm 75 being received behind an arcuate dial strip 76 cemented to the inside surface of the margin of aperture 75 concentrically with the pivot sleeve 60 and marked with an angle scale 77 which is visible along the arcuate margin of the viewing window 75. As shown in FIG. 6, the angle scale strip 76 has a cross-section which slopes inwardly and rearwardly, with the angle markings being provided on the inwardly and rearwardly-sloping surface of the strip.

An arcuate flat strip 78 is cemented to rear plate 13 behind the pointer 74 and adjacent the angle strip 76, as shown in FIG. 6, the arcuate strip 78 being calibrated with a scale 79 representing radial circle-scribing distances when the device is to be employed as a compass, which will be presently described. The scale 79 may be marked in any suitable units, such as inches and fractions of inches. A similar arcuate strip 80 is cemented to rear cover plate 13 inwardly-adjacent the strip 78, concentric with pivot sleeve 60, as in the case of the strip 78, the inner strip 80 being marked with a calibrated scale 81 representing marking-gauge distances, in inches and fractions of inches, when the device is employed as a marking gauge, as will be presently described.

A thin arcuate guide plate 82 is rigidly secured to a block 83 which is, in turn, rigidly secured by cement, or other suitable means, to the rear cover plate 13, the guide plate 82 being formed with an arcuate slot 84 concentric with pivot sleeve 60. A clamping screw 85 extends through an aperture in the pointer 74 and through the slot 84, being provided with a nut 86 which is non-rotatably-engaged with the arcuate block 83. A bearing washer 87 is provided on the clamping screw 85, so that when the screw 85 is rotated in one direction, the pointer arm 74 is clamped to the guide plate 82. This provides a means for clamping the pointer 74 at a desired angle position, or at a desired marking along either of the scales 79 and 81. This, of course, clamps the arm 63 in a corresponding outwardly-swung position. Normally, the arm 63 is retained in the slot 64 with the pointer arm 74 in the position as shown in FIG. 1, the screw 85 being tightened to lock the arm 63 in its housed position. Under these conditions, as shown in FIG. 1, the pointer 74 shows zero on the angle scale 77 and correspondingly indicates zero readings on the scales 79 and 81.

The upper left corner portion of the housing, as viewed in FIG. 5, contains a retractable center point assembly designed to be employed in conjunction with the arm 63. The center point assembly comprises a pointed shank element 90 which is extensible through an aperture 91 provided in the upper left corner of the separator wall member 14, the shank 90 being biased to a retracted position, as shown in FIG. 5, by a coiled spring 92 surrounding the shank and bearing between a collar element 93 provided on the rear portion of the shank and the corner defined at the inner rim of aperture 91. The rear end of the shank 90 is provided with a longitudinally-extending key 94 which engages slidably through a slot 95 provided in an angle bracket 96 rigidly secured to rear cover plate 13, as shown in FIGS. 9 and 10. An aperture 97 is provided in front cover plate 12 to provide access to the collar member 93, said collar member being provided with projections 98 allowing the collar member to be manually engaged by the user when it is desired to extend the center point member 90, for example, to the dotted-view position thereof shown in FIG. 5. Thus, the user may engage a projection 98 and push the scriber point outwardly to extended position, sufficiently to move the key 94 completely through the slot 95, after which the user may rotate the shank 90 to rotate the key 94 out of registry with the slot 95. If the operator then releases the projection 98, the action of the spring 92 urges the key 94 against the bracket 96, but maintains the shank 90 extended, since the key 94 cannot enter and slide through the slot 95 in its non-registering position. The bore 91 cooperates with the shank 90 to retain the shank in proper alignment with the bore when it is in its extended position. To return the shank 90 to its retracted position, it is only necessary to engage one of the projections 98 through the enlarged aperture portion 99, shown in FIG. 1, to rotate the shank 90 to a position wherein the key 94 registers with slot 95, after which the spring 92 expands and returns the shank 90 to its fully-housed retracted position, shown in FIG. 9.

As shown in FIGS. 1 and 5, the collar member 93 is preferably provided with at least two projections 98, arranged perpendicularly to each other.

As will be seen from FIG. 5, the counterclockwise rotation of the arm 63, as viewed in FIG. 5, is limited by the abutment of the pointer element 74 with the right transverse portion of the separator wall member 14. Thus, the pointer element 74 abuts said transverse portion of separator member 14 when the arm 63 is housed in the solt 64. The arm may be rotated in a clockwise direction from this position, when desired, by first loosening the thumbscrew 85 and then engaging the protruding end of the scribing member 66 with the fingernail, allowing the arm to be rotated clockwise, as viewed in FIG. 5, for example, to the dotted-view position shown. As previously-mentioned, the arm may be locked in a selected extended position by tightening the thumbscrew 85. Clockwise rotation of arm 63 is limited by the engagement of the edge 105 of pointer arm 74 with an eccentric adjustable stop ring 106 locked in adjusted position by the tightening of its headed pivot screw 107, which secures the eccentric ring 106 to cover plate 13. The ring 106 is adjusted so that the edge 105 is exactly at the 90° position on scale 77 when it abuts the ring.

Thus, when it is desired to employ the instrument for marking, scribing, or gauging, or for angle measuring, involving the use of the arm 63, said arm may be first rotated to an extended position, for example, the dotted-view position of FIG. 5. The center pivot member 90 may then be extended in the manner above-described, for example, to the dotted-view position thereof shown in FIG. 5, and held in said extended position by rotation thereof to move the key element 94 to an unregistering position with respect to its guide slot 95, whereupon the bracket 96 will hold the pivot shank 90 extended against the biasing force of the spring 92. If the implement is to be employed to scribe an arc at a desired angle the scribing point 66 is reversed, as above-described, to expose the marking point 67. The arc desired may then be scribed, using either the angle scale 77, if the radius of the arc is to be described in terms of an angle, or using the radius inch scale 79 to set the radius in inches, if appropriate. The pointed shank member 90 is, of course, set at the center of the arc.

If the device is to be employed as a marking gauge, the gauge distance is marked as between the top longitudinal edge of the housing of the device 11 and a marking pencil engaged with the notch 73 and contacting the workpiece. The top longitudinal edge of the device is held against the edge of the workpiece. The distance between the edge of the workpiece and the notch 73 will then be shown on the scale 81 by the index edge 105 of the pointer member 74.

The instrument is preferably made suitably small so that it can be conveniently carried in the user's pocket, or in a suitable pouch provided therefor which may be suspended in any suitable manner, for example, from the user's belt.

Each of the calibrated dials 77, 79 and 81 is preferably of a different color to facilitate distinguishing one from another.

As will be seen from FIG. 6, the sloping angle dial provided by the strip 76 is recessed relative to the plane of the front cover member 12, and is thus protected against scratching or other damage. Similarly, the recessed positions of the other scales 79 and 81 likewise protect them from damage. It will be further noted that the pointer member 74 is located very close to the scale with which it is to be used, thereby minimizing errors from parallax.

As shown in FIG. 1, the arm 63 is exposed at the top end portion of the aperture 75, in the position shown in FIG. 1, so that when it is desired to push out the arm 63, it is merely necessary, after loosening the thumbscrew 85, to engage the finger with the exposed portion of the arm and push outwardly, as an alternative to inserting the fingernail beneath the exposed end of the scribing member 66, as above-described.

As previously-mentioned, the front cover plate 12 is merely held in place by the screws 16 so that by removing said screws access can be readily obtained to the interior of the instrument for making any necessary repairs, or adjustments. With the cover plate 12 secured in place, all the components of the instruments are protected and lie between the planes of the front cover plate 12 and the rear cover plate 13, minimizing the risk of catching on the clothing when the instrument is inserted in the user's pocket. This feature also allows the instrument to be employed in a flat position, as will be required by some types of uses thereof, for example, in laying out geometric designs such as stars, polygons, or the like, working in the center portions of a panel.

It will be noted that the various components of the instrument may be employed in combination with each other to provide a desired over-all measurement or computation. As an example, the movable arm 63 may be employed both for laying out, or measuring angles, and also for measuring inclines, or pitch, in combination with the bubble level assemblies 44 and 45, and also in cooperation with the plumb bob 32. Likewise, the instrument may be employed as an adjustable marking gauge, or compass, wherein the pertinent data such as the angles, gauge distances, or radius can be read on the appropriate scales. The flexible steel tape 20 may be employed as a straight-edge by engaging the T-shaped hooked member 23 with an edge of workpiece and pulling out the steel tape, with the tape edge lying close to a surface of the workpiece, whereby the straight edge of the tape may be employed for extending straight lines, or the like. The plumb bob 32 may be employed not only for the normal plumb bob functions, but also, since it is preferably of hardened steel, or similar hard metal, it may also be employed as a scriber for marking along the adjustable arm 63, or may be engaged in the notch 73 to form a part of the marking gauge structure. The scribing point assembly 66 may likewise be removed, at times, so that it may be employed for scribing along an edge of the arm 63; or may be engaged in the notch 73 to form a part of the marking gauge assembly.

While a specific embodiment of an improved combination measuring and marking instrument has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A combination measuring and marking instrument comprising a relatively flat housing, a pointer shank member slidably disposed in said housing and being extensible therefrom to define a compass pivot point, an arm pivoted to said housing at a location spaced from said shank member for swinging movement in the plane of the housing and being receivable adjacent one side of the housing, an arcuate scale on the housing concentric with the pivotal connection of said arm, a pointer element rigidly connected to said arm and movable along said scale, means to lock the pointer element in an adjusted position relative to said scale, and spring means biasing said shank member inwardly, wherein said housing includes a bracket having a flange formed with a slot extending substantially parallel to said shank member, said flange being located adjacent said shank member, said flange extending transversely of the shank member, and wherein said shank member has a key slidably engageable in said slot, said shank member having at least two projections perpendicular to each other for rotating the shank member when in an extended position to rotate the key out of registry with said slot and for subsequently rotating said shank member to return said key into registry with said slot, said housing being apertured adjacent said projections to provide access thereto.

2. The combination measuring and marking instrument of claim 1, and wherein said one side of the housing is formed with a longitudinal slot and wherein said arm is receivable in said longitudinal slot.

3. The combination measuring and marking instrument of claim 2, and wherein said means to lock the pointer element comprises a clamping screw on the pointer element, said housing having a portion formed with an arcuate slot concentric with said pivotal connection, said screw extending through said arcuate slot and being provided with nut means for clamping the pointer element against said slotted portion.

4. The combination measuring and marking instrument of claim 3, and a scribing element removably mounted in the free end portion of the arm.

5. The combination measuring and marking instrument of claim 4, and wherein said arm is formed with a notch at its free end to accommodate a marking point.

References Cited

UNITED STATES PATENTS

| | | | |
|---|---|---|---|
| 151,521 | 6/1874 | Traut | 33—217 |
| 330,589 | 11/1885 | Janssen | 33—106X |
| 593,608 | 11/1897 | Rosenkrantz | 33—106 |
| 642,888 | 2/1900 | Van Vliet | 33—93X |
| 718,817 | 1/1903 | Caldwell et al. | 33—93 |
| 1,453,625 | 5/1923 | Johnson | 33—93 |
| 2,251,208 | 7/1941 | Sigmon | 33—93 |
| 3,096,586 | 7/1963 | Albright et al. | 33—75X |

FOREIGN PATENTS

| | | | |
|---|---|---|---|
| 143,597 | 11/1935 | Austria | 33—75 |
| 869,123 | 10/1941 | France | 33—93 |
| 3,245 | 1902 | Great Britain | 33—152(C) |
| 114,689 | 4/1918 | Great Britain | 33—75 |
| 288,024 | 4/1928 | Great Britain | 33—138 |
| 266,920 | 5/1950 | Switzerland | 33—75 |

OTHER REFERENCES

"Scriber has retractable point": Item on page 230 of Popular Science for February 1957. Scientific library catalogue number Q1/P8.

ROBERT B. HULL, Primary Examiner

US. Cl. X.R.

33—93, 138, 148, 152